(12) United States Patent
Kajitani et al.

(10) Patent No.: US 8,768,681 B2
(45) Date of Patent: Jul. 1, 2014

(54) CONTROL UNIT SIMULATION METHOD, SYSTEM, AND PROGRAM

(75) Inventors: Koichi Kajitani, Kawasaki (JP); Hideaki Komatsu, Yokohama (JP); Shuichi Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 12/436,870

(22) Filed: May 7, 2009

(65) Prior Publication Data

US 2009/0281779 A1  Nov. 12, 2009

(30) Foreign Application Priority Data

May 9, 2008  (JP) .................................. 2008-124053

(51) Int. Cl.
*G06F 9/455* (2006.01)
(52) U.S. Cl.
USPC .......................................................... 703/23
(58) Field of Classification Search
CPC .................................................... G06F 11/261
See application file for complete search history.

(56) References Cited

FOREIGN PATENT DOCUMENTS

| JP | 05-101015 | 4/1993 |
|---|---|---|
| JP | 6-161987 | 6/1994 |
| JP | 10260954 | 9/1998 |
| JP | 11-014507 | 1/1999 |
| JP | 2001-331346 | 11/2001 |
| JP | 2003-316603 | 11/2003 |
| JP | 2008-001261 | 1/2008 |
| JP | 2008027225 | 2/2008 |
| JP | 2008-084121 | 4/2008 |
| WO | 2008047555 | 4/2008 |

OTHER PUBLICATIONS

Pavlicek et al. "Multi-agent-Based Diagnostics of Automotive Electronic Systems"HoloMAS 2007, LNAI 4659, pp. 371-382.*
Giusto et al. "Rapid design exploration of safety-critical distributed automotive applications via virtual integration platforms" The Journal of Systems and Software 70, 2004, pp. 245-262.*
Hui Shao, "Design of a Simulation Framework for Automotive Networks using SystemC", Jun. 30, 2007, 78 pages.*
V. Aho, Ravi Sethi, Jeffrey D. Ullman, "Compilers Principles, Technologies, and Tools", Addison-Wesley Publishing Company, 1986, pp. 608-633.

* cited by examiner

*Primary Examiner* — Suzanne Lo
(74) *Attorney, Agent, or Firm* — Jon A. Gibbons; Fleit Gibbons Gutman Bongini & Bianco PL (57) ABSTRACT

A method, system, and computer readable article of manufacture for simulating a mechanism system controlled by a plurality of electronic control units operating at different clock rates. The simulation system includes a mechanism system simulator; a plurality of electronic control unit emulators for electronically emulating the respective plurality of electronic control units, each thereby receiving an input signal with a time and giving an output signal with a time; and a scheduler for receiving and storing the output signals with the times from the plurality of electronic control unit emulators, and for providing, in response to a change in the output signal coming from the electronic control unit emulator and having a relatively late time, the output signal with a time preceding the relatively late time to the mechanism system simulator.

15 Claims, 10 Drawing Sheets

FIG. 1

(PRIOR ART)

FIG. 2

(PRIOR ART)

CONTROL UNIT SIMULATION METHOD, SYSTEM, AND PROGRAM

CROSS-REFERENCE TO RELATED APPLICATION

This application claims priority under 35 U.S.C. §119 from Japanese Patent Application No. 2008-124053 filed on May 9, 2008, the entire contents of which are incorporated herein by reference.

BACKGROUND OF THE INVENTION

1. Field of the Invention

The present invention relates to testing of an electronic control unit (ECU) which is used in an automobile, and more particularly relates to software-based testing of multiple ECUs.

2. Description of Related Art

The automobile, in its early stage, that is, in the early twentieth century, was composed of: an engine as a power source; and mechanical parts including a brake, an accelerator, a steering wheel, a transmission and a suspension. Almost no electrical mechanisms were used except for an ignition plug for the engine, and for headlights.

However, around the 1970s, there arose the need to control the engine efficiently to deal with air pollution, oil crises, and the like. Thus, an ECU started to be used for engine control. The ECU generally includes: an input interface for executing, for example, A/D conversion of an input signal from a sensor; a logic operation part (microcomputer) for processing a digital input signal according to a predetermined logic; and an output interface for converting the result of the processing into an actuator operating signal.

Here, examples of the sensor for inputting signals to the ECU include a temperature sensor for measuring engine temperature, a pressure sensor for estimating the pressure of suction by the engine, a throttle position sensor for measuring the stepping amount of an accelerator pedal, a steering angle sensor, a vehicle altitude sensor, a rotation speed sensor, a knock sensor, an acceleration sensor, a flow rate sensor, an oxygen sensor, and a lean air fuel ratio sensor.

Examples of actuators driven by an output signal coming from the ECU include electromagnetic solenoids, and motors. A solenoid is used, for example, for the engine injector, shift control of the transmission, brake valve control, and the door lock.

Motors are used mainly as: a servo mechanism for an engine starter motor, fuel control of the engine, a brake hydraulic pump, steering angle control, steering wheels, wipers, power windows, seat belts, and air bags.

In the 1970s, the ECU was mainly used for the efficient control of the engine. However, in the 1980s, ECUs started to be used not only for the above purpose but also for running a car more safely and comfortably. Thus, there are now many cases where over 50 ECUs are installed in one car. When a number of ECUs are installed in the car, the multi-ECU case, as described above, it becomes very difficult to test at the development stage whether multiple ECUs are properly operating in cooperation with each other.

As a technique that has been previously used for such a test, there is HILS (Hardware In the Loop Simulation). Particularly, an environment for testing all the ECUs in the car is called a full-vehicle HILS. In the full-vehicle HILS, a test is conducted in a laboratory according to a predetermined scenario by connecting an actual ECU to a dedicated hardware device for emulating an engine, a transmission mechanism and the like. The output from the ECU is inputted to a monitoring computer and further displayed on a display. Thus, an operator conducting the test checks if there is any abnormal operation while looking at the display.

However, in the HILS, the dedicated hardware device is used and physical wiring connection between the device and the actual ECU is required. Thus, preparation for this takes a lot of work. Moreover, when a test is conducted by replacing the ECU with another one, the device and the ECU have to be physically reconnected to each other. Thus, much effort is required. Furthermore, since the test uses the actual ECU, it takes actual time to conduct the test. Therefore, it takes an enormous amount of time to test many scenarios. Moreover, the hardware device for emulation of the HILS is generally very expensive.

Therefore, there has recently been a technique that uses software configuration without using the expensive hardware device for emulation. This technique, called SILS (Software In the Loop Simulation), is for configuring all components to be installed in the ECU, such as a microcomputer, an I/O circuit and control scenarios, by use of a software simulator. According to the SILS, a test can be executed without the hardware of the ECU.

However, the known SILS only performs software verification on a single function and does not make it possible to achieve SILS for a multi-ECU.

Japanese Unexamined Patent Application Publication No. Hei 6-161987 discloses simulation of hardware having desired functions by using a matrix switch for the purpose of realizing artificial ECU hardware and thus enabling real machine evaluation by software.

Japanese Patent Application Publication No. Hei 11-14507 discloses a vehicle simulation device including an engine control simulator (ECU) and a vehicle control simulator, which is intended to enable desk verification of logic of an entire vehicle. The ECU calculates control parameters of an engine model and transmits the result of the calculation to the vehicle control simulator. The vehicle control simulator uses the control parameters sent from the ECU to calculate a state quantity of each part of a vehicle model, and sends the result of the calculation back to the ECU. The vehicle model includes a driver model, an inlet system model, a fuel system model, a combustion system model, an engine temperature estimation model, a drive system model, a catalyst model, an Air/Fuel Ratio (A/F) sensor model and a rear $O_2$ sensor model. The driver model has vehicle speed pattern input means for inputting a target vehicle speed change pattern.

The above conventional techniques disclose a technique of simulating the ECU by use of software. However, it is very difficult or practically impossible to apply such conventional techniques to software simulation of the multi-ECU case. This is because the ECUs individually have microprocessors and have different clock rates. Therefore, a new technique is required, which has not been taught by the conventional techniques, to simulate an entire test environment in which such individual ECUs are connected by use of software.

SUMMARY OF THE INVENTION

An embodiment of the present invention provides a technique of simulating a configuration of multiple ECUs used in an automobile and similar apparatus.

ECU emulators are speculatively emulated. Specifically, the ECU emulators are operated asynchronously at different clock rates to increment a speculative time for each one. Furthermore, a system scheduler is provided to maintain all the speculative times sent by the ECU emulators and to update a committed time. When an ECU emulator receives an external input having a time stamp before the speculative time of its own, the ECU emulator reruns a task by setting a clock of its own back to a time in the past indicated by the time stamp. For this purpose, each ECU emulator retains its internal state preferably in its private memory for at least a certain period of time. Thus, a task can be reproduced by setting the internal state corresponding to the time set back.

According to an aspect of the invention, there is provided a simulation system for simulating a mechanism system controlled by a plurality of electronic control units operating at different clock rates. The simulation system includes: a mechanism system simulator; a plurality of electronic control unit emulators for electronically emulating the respective plurality of electronic control units, each thereby receiving an input signal with a time and giving an output signal with a time; and a scheduler for receiving and storing the output signals with the times from the plurality of electronic control unit emulators, and for providing, in response to a change in the output signal coming from the electronic control unit emulator and having a relatively late time, the output signal with a time preceding the relatively late time to the mechanism system simulator.

According to another aspect of the invention, there is provided a computer device implemented method for simulating a mechanism system controlled by a plurality of electronic control units operating at different clock rates. The simulation method includes the steps of: loading into a memory of the computer device, a plurality of electronic control unit emulators and a mechanism system simulator controlled by the computer device; emulating electronically the plurality of electronic control units by the electronic control unit emulators; receiving an input signal with a time and giving an output signal with a time by each electronic control unit emulator; receiving and storing the output signals with the times from the plurality of electronic control unit emulators by a scheduler; and providing in response to a change in the output signal coming from each of the electronic control unit emulators and having a relatively later time, the output signal with a time preceding the relatively later time to the mechanism system simulator, thereby simulating a mechanism system controlled by a plurality of electronic control units operating at different clock rates.

In yet another aspect of the invention, there is provided a computer readable article of manufacture tangibly embodying computer readable instructions for executing a computer implemented method by a computer device for simulating a mechanism system controlled by a plurality of electronic control units operating at different clock rates. The simulation method includes steps of: loading, into a memory of the computer device, a plurality of electronic control unit emulators and a mechanism system simulator so as to be controlled by the computer device, the electronic control unit emulators electronically emulating respective plurality of electronic control units, each thereby receiving an input signal with a time and giving an output signal with a time; and receiving and storing the output signals with the times from the plurality of electronic control unit emulators, and providing, in response to a change in the output signal coming from the electronic control unit emulator and having a relatively late time, the output signal with a time preceding the relatively late time to the mechanism system simulator, thereby simulating a mechanism system controlled by a plurality of electronic control units operating at different clock rates.

BRIEF DESCRIPTION OF THE DRAWINGS

For a more complete understanding of the present invention and its advantages, reference is now made to the following description taken in conjunction with the accompanying drawings.

DETAILED DESCRIPTION OF THE PREFERRED EMBODIMENTS

With reference to the drawings, a configuration and process according to an embodiment of the present invention will be described below. In the following description, unless otherwise noted, the same components are denoted by the same reference numerals throughout the drawings. Note that the configuration and process are described here as one embodiment of the invention. Thus, it should be understood that there is no intention to interpret the present invention so as to limit the technical scope of the present invention to this embodiment.

According to an embodiment of the present invention, a multi-CPU work station is preferably prepared. Moreover, a software emulator is prepared for each ECU. Generally, the software emulator of the ECU can be obtained from a manufacturer of the ECU.

The software emulator of each ECU is preferably interfaced with a predetermined layer in an operating system of the multi-CPU work station so as to run on the work station. Each of CPUs in the multi-CPU is preferably assigned to the software emulator of each ECU. Thus, each ECU emulator can be independently operated by each CPU. If the number of the CPUs is smaller than the number of the ECUs, multiple ECU emulators are assigned to one CPU. In either case, the operating system assigns one process for each of the ECU emulators. Thus, the respective ECU emulators can perform emulation so as to be operated at unique different clocks or clock rates. Specifically, the ECU emulators can be heterogeneous ECUs.

As a dedicated memory for internal processing, a part of the memory of the work station is assigned to each of the ECU emulators. Furthermore, the ECU emulator can also access a location assigned as a shared memory of the work station. Through the shared memory, the ECU emulators can exchange data, synchronize with each other or communicate with each other. Alternatively, the ECU emulators can be connected through a CAN (Controller Area Network) emulator.

According to an embodiment of the present invention, the ECU emulators are speculatively emulated. Specifically, the ECU emulators are operated asynchronously at different clocks, or different clock rates, to increment a speculative time for each one. Furthermore, a system scheduler is provided to maintain all the speculative times sent by the ECU emulators and to update a "committed" time. When the ECU emulator receives an external input having a time stamp before the speculative time of its own, the ECU emulator reruns a task by setting a clock of its own back to a time in the past indicated by the time stamp only if the speculation has failed. For this purpose, the ECU emulator retains its internal state preferably in its dedicated or private memory for at least a certain period of time. Thus, the task can be reproduced by setting the internal state corresponding to the time set back.

As described above, speculative emulation enables a heterogeneous multi-ECU, more preferably, full-vehicle software emulation by use of the heterogeneous multi-ECU. Moreover, the full-vehicle software emulation can increase the clock speed. Thus, the full-vehicle software emulation can be performed much faster than the HILS.

Before describing a configuration for achieving the present invention, an ECU will be described first. The ECU generally includes: an input interface for executing, for example, A/D conversion of an input signal from a sensor; a logic operation part (microcomputer) for processing a digital input signal according to a predetermined logic; and an output interface for converting the result of the processing into an actuator operating signal.

For convenience of explanation, the embodiment of present invention will be described below in connection with an ECU for an automobile. However, it should be understood that the present invention is not so limited but can be applied to general mechatronics, mechanical and electronic, mechanisms having other ECUs, such as aircraft and robots.

The ECU uses the sensor to detect a peripheral or environmental state, a state of a drive mechanism such as an engine, and contents of an instruction operation performed by a person, and inputs those detected as signals. To be more specific, there are included signals from a water temperature sensor, an inlet temperature sensor, a charging pressure sensor, a pump angle sensor, a crank angle sensor, a vehicle speed sensor, an accelerator position sensor, an A/T shift position, a starter switch, an air conditioner ECU.

The ECU inputs the signals described above and outputs signals, for example, for driving an electromagnetic spill valve, a fuel cut solenoid, a timing control valve, an intake throttle VSV, a glow plug relay, a tachometer, and an air conditioner relay. It is not impossible for one ECU to output driving signals for controlling multiple different mechanisms. However, it is not reasonable for a single ECU to control multiple mechanisms, such as the engine and the air conditioner, for example, having different responsiveness and strictness of control of the mechanism. Therefore, an automobile generally is provided with multiple ECUs.

Figure 1:
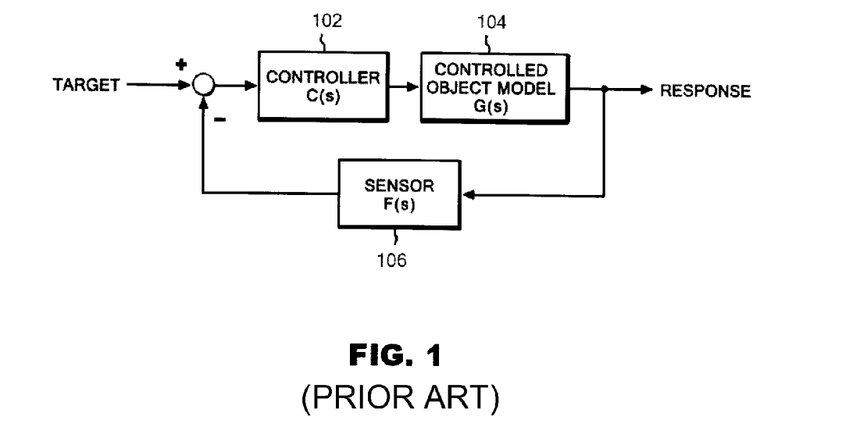
FIG. 1 shows an example of a feedback closed-loop system that is a typical control of an ECU.

FIG. 1 is a drawing showing an example of a feedback closed-loop system that is a typical control of the ECU. Specifically, in FIG. 1, a certain target signal is inputted to a controller 102 that is the ECU. Thereafter, the ECU performs internal processing of the target signal to output a driving signal and drives a plant 104, a component of the automobile such as the engine, which is a controlled object model. Subsequently, an output from the plant 104 is fed back to the input to the controller 102 through a sensor 106. In FIG. 1, C(s) is the response function of the controller, G(s) is the response function of the model to be controlled, and F(s) is the response function of the sensor.

Here, the following parameters are given as the target signal, for example: a throttle opening, an idle control, braking force, a shift, starter ON/OFF, a battery voltage, injection conduction time, the number of times of injection conduction, a deposit, a dwell angle, an advance angle value, an intake completion flag, an ignition completion flag, atmospheric pressure, a vehicle weight, a rolling resistance coefficient, a road gradient, an adhesion coefficient, and an intake temperature.

Moreover, the throttle opening, an intake pressure, an intake air quantity, the shift, an engine speed, a vehicle speed, an exhaust temperature, $O_2$, a coolant temperature, an air fuel ratio, knock, ignition abnormal and the like are fed back as sensor signals.

The object to be controlled by the ECU is a mechanism system to be solved by a Newtonian mechanics equation, an electrical drive circuit to be solved by a response equation of an electrical circuit, or a combination of the two. These are basically differential equations and can be described by being transformed into response functions by Laplace transform according to control engineering.

Figure 2:
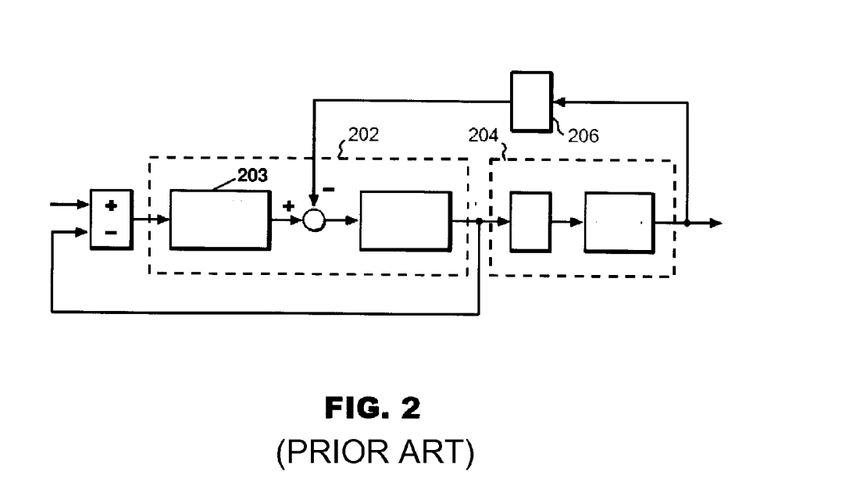
FIG. 2 shows an example of description of the feedback closed-loop system by a response function.

FIG. 2 shows an example of such description by the response function. In FIG. 2, the portion surrounded by a broken line 202 corresponds to the controller 102 in FIG. 1, the portion surrounded by a broken line 204 corresponds to the controlled object model 104, and the block 206 corresponds to the sensor 106. Box 203 includes parameters for proportional and integral values. The remaining boxes of FIG. 2 represent the plant to be controlled. Note that it should be understood that FIG. 2 shows an example of a depiction of the response function and is not intended to particularly limit the present invention.

Figure 3:
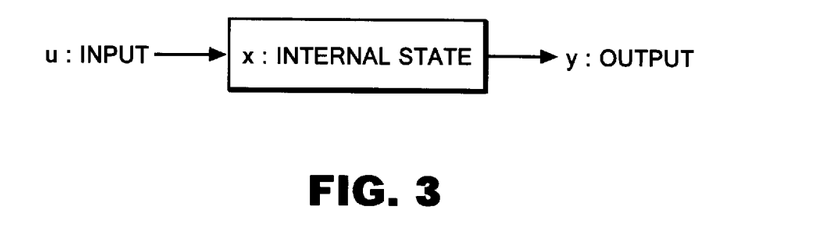
FIG. 3 shows a temporal transition of a clock response of an ECU software emulator.

First, for example, the object to be controlled by the ECU is the mechanism system to be solved by the Newtonian mechanics equation. Then, a control output of the ECU at a certain point has internal state variables such as a position and a speed of a movable portion of the mechanism system. Thus, the output is not determined only by an input at any specific point. That is also the case for the electrical circuit. There are internal state variables such as the amount of charge left in a capacitor in the electrical circuit and magnetic fields resulting from inductance of a coil. Therefore, for an input u, the ECU outputs a value y obtained by taking into consideration an internal state x, as shown in FIG. 3.

Meanwhile, for the purpose of testing such as the SILS described above, auto parts manufacturers provide software emulators of ECUs of devices they provide. Specifically, a function as shown in FIG. 2 is realized purely in a software-based manner by an executable program having codes assembled or compiled in the program. The codes are written in a language such as an assembler language or C.

Figure 4:
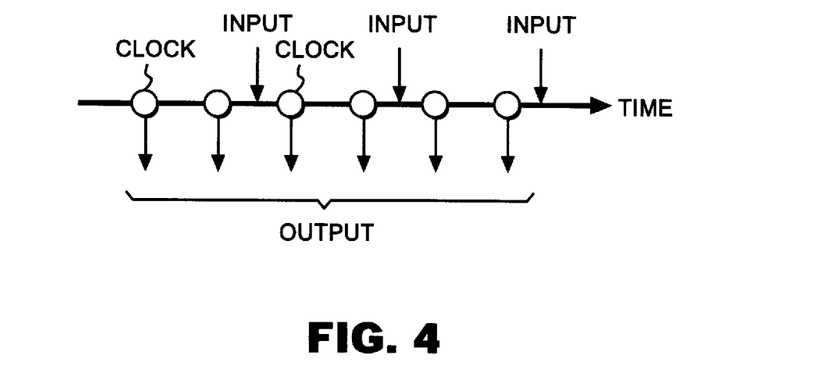
FIG. 4 shows a state where the software emulator of the ECU is operated at predetermined clock rate.

FIG. 4 is a drawing showing a state where the software emulator of the ECU is operated at predetermined clock rates. As shown in FIG. 4, the software emulator supplies output signals in synchronization with the clocks coming in at fixed intervals. However, as shown in FIG. 4, inputs from the sensor come in asynchronously with a sampling time by the clocks.

Assuming that an actual ECU calculates an output based on the inputs from the sensor at $c_i$ [1/sec] for a sampling time $t_i$ [sec/sample]. In this case, if a converted clock of emulation is c [1/sec], an actual operation interval is set to $t=t_i*c_i/c$ [sec/sample].

In the embodiment of the present invention, the internal state of the software emulator of the ECU is retrieved and utilized. Depending on the software emulators, there are cases where the internal state can be retrieved and where the internal state cannot be retrieved as it is. Therefore, in the case where the internal state of the software emulator of the ECU cannot be retrieved as it is, the following processing is performed by use of a source code analysis tool.

If the source code of the software emulator of the ECU is available, the source code is used as it is. However, if there is only an executable binary file, the file is disassembled or decompiled by use of a predetermined tool. Thus, for the source code of the software emulator of the ECU, a data flow analysis technique is applied to divide the source code into basic blocks. The basic blocks mean divided portions of the source code, which are obtained by dividing the source code at a spot where multiple controls converge or where the control is branched into multiple controls. Such basic blocks are used as nodes and those nodes are connected to each other so as to be linked with flows of the branched controls. Thus, a directed graph structure is formed. This structure is called a control flow graph. The control flow graph has a start point node and an end point node. All nodes that can be executed by the program have effective edges from the start point node. Among the basic blocks, all terminal nodes of control including statements such as exit and return have effective edges to the end point node.

Next, Use/Def analysis is performed for all possible paths from the start point node to the end point node in the control flow graph. Here, Use means the case where a certain variable is used for storing a value in another variable. Typically, Use is a right-hand side of an assignment expression. Def means the case where a value is stored in a certain variable. Typically, Def is a left-hand side of the assignment expression.

In this case, for each of the paths is checked as to whether or not there is a variable subjected to Use before Def or without Def, or in other words, whether there is an undefined reference variable. If there is the undefined reference variable, the name of the variable is saved. After scanning of all the paths is thus performed, a wrapper code is generated and is described later by use of the stored variable name.

Execution flow scanning and the Use/Def analysis can be executed more efficiently by use of the data flow analysis technique. Thus, description will be given below of the technique.

A first step of the data flow analysis is to calculate a def list in each of the basic blocks. Specifically, a list of variables used in the entire program is expressed by 1 bit and is expressed by a bit vector so as to set variables defined for each basic block to 1 and to set those not defined for each basic block to 0.

A second step is to calculate an attainable def list in the entire program. Specifically, in each basic block, if there are multiple inputs, the inputs are taken a logical multiplication (AND) to be set as an input to itself. An output from the block takes a logical sum (OR) of the input and the def list defined by itself and is handed over to a subsequent basic block. As an execution order, a depth-priority order on the control flow graph is efficient.

A third step is to obtain a closure of the attainable def list by use of a closure analysis algorithm. Thereafter, the second step described above is repeated until output def lists of all the basic blocks are no longer changed. Here, the closure means a value linked with an environment.

A fourth step is to find use of undefined variables. Specifically, use of variables as "use" is detected, the variables being expressed as 0 in an input def list of each basic block.

Note that further details about the data flow analysis will be found in Alfred V. Aho, Ravi Sethi, Jeffrey D. Ullman, "Compilers Principles, Technologies, and Tools", Addison-Wesley Publishing Company, 1986, pp. 608-633, and in similar publications.

Now, for example, it is assumed that an original ECU simulation source code is expressed by a function Func(x, y, z) and that a and b are registered as undefined reference variables. Then, for example, a function _Func(x, y, z, _a, _b) is prepared.

```
_Func(x, y, z, _a, _b)
{
a= _a;
b= _b;
Func(x, y, z);
_a= a;
_b= b;
return;
}
```

The following portion is called an input wrapper code

```
_Func(x, y, z, _a, _b)
{
a= _a;
b= _b;
``` and the following portion is called an output wrapper code.

```
_a= a;
_b= b;
return;
}
```

Note that the portion Func(x, y, z); does not have to be a function call but can be in-line expansion. By calling such a function _Func(x, y, z, _a, _b) with appropriate values assigned to _a and _b, an internal state of Func(x, y, z) can be set. Moreover, as a result of calling _Func(x, y, z, _a, _b), values of the internal state after processing are set in _a and _b. Thus, according to need, those values can be used, for example, by separately storing the values. The source codes with the wrapper codes attached thereto them as described above are compiled or assembled to generate an executable program.

Moreover, depending on specifications of a specific processing language such as C++, it can be required that reference operators & as arguments in the function are given so as to obtain a function such as _Func(x, y, z, &_a, &_b), not _Func(x, y, z, _a, _b).

Figure 5:
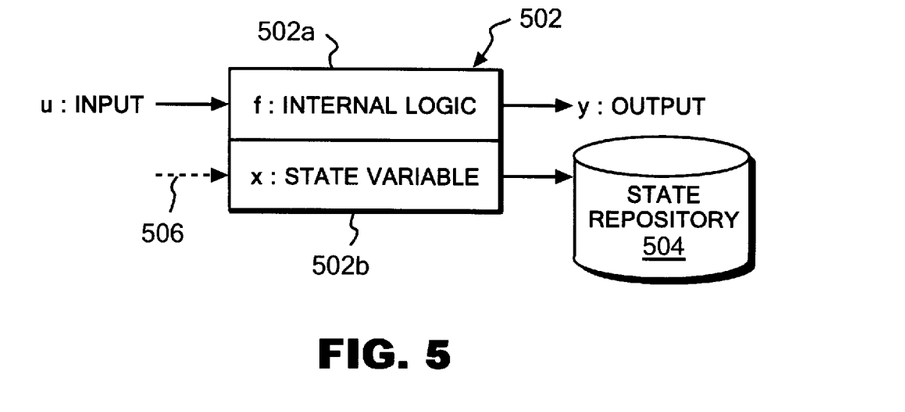
FIG. 5 shows a block diagram of the software emulator of the ECU after retrieval of an internal variable has been enabled.

FIG. 5 schematically shows the software emulator of the ECU after retrieval of the internal state or internal variable has been enabled. As shown in FIG. 5, the software emulator 502 of the ECU is preferably divided into a portion indicating an internal logic f and an internal state or a state variable x.

Accordingly, output y=f(t, x, u, . . . ) can be described by use of the internal logic f. Here, t is time. Moreover, by separating the code related to the state variable x, the state variable x and, preferably, the input u can be written into a hard disk drive as a state repository 504 at an arbitrary point, in other words, typically at a timing of the output shown in FIG. 4.

The separation of the code related to the state variable x also achieves the following effect besides the above. Specifically, as indicated by an arrow 506, the state variable x can be set at an arbitrary point in the software emulator 502. Thus, by selecting the input and the state variable x from the state repository 504 and setting the selected input and variable, the software emulator 502 of the ECU can be set back to a state at an arbitrary point where the state variable x is written into the state repository 504 and can be allowed to redo the calculation.

Figure 6:
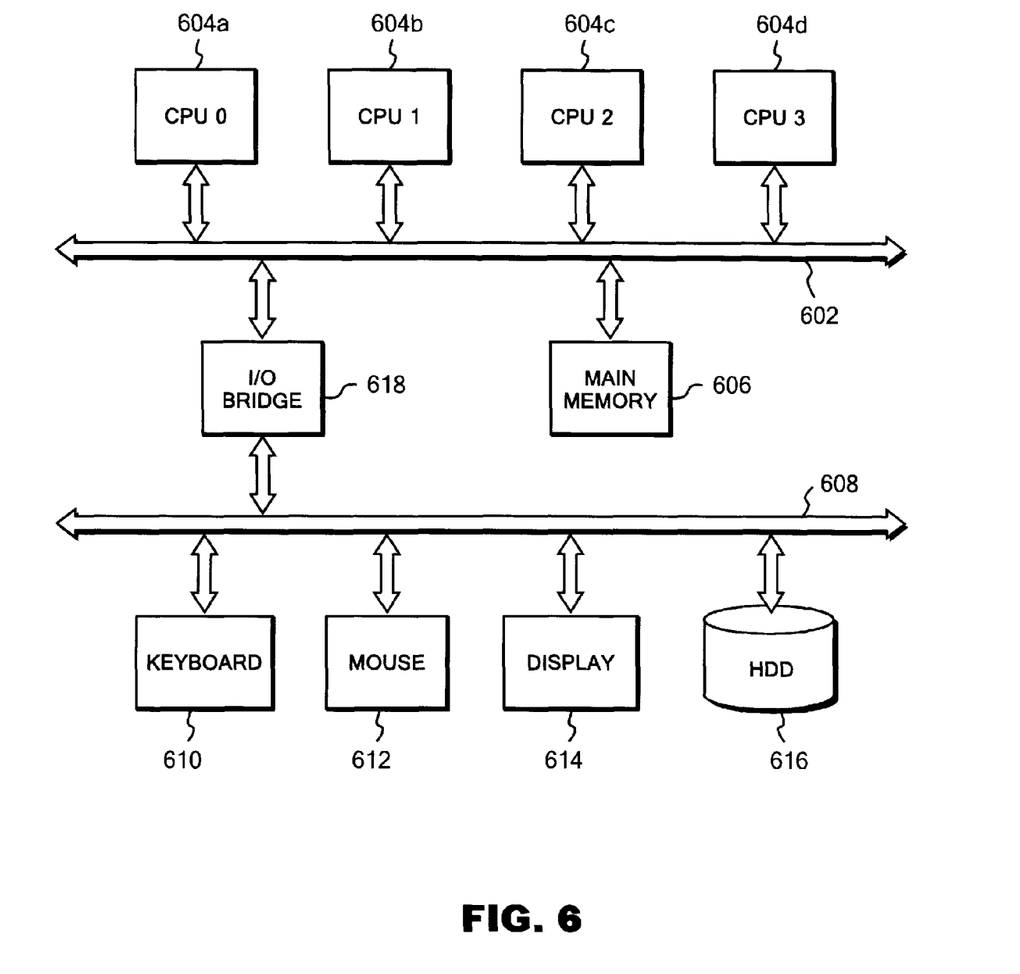
FIG. 6 shows a hardware block diagram of a computer used for carrying out the present invention.

Next, with reference to FIG. 6, description will be given of the hardware of a computer used for carrying out the present invention. In FIG. 6, multiple CPUs, including CPU0 604a, CPU1 604b, CPU2 604c and CPU3 604d, are connected to a host bus 602. A main memory 606 for computing processing of CPU0 604a, CPU1 604b, CPU2 604c and CPU3 604d is further connected to the host bus 602.

Additionally, a keyboard 610, a mouse 612, a display 614 and a hard disk drive, HDD, 616 are connected to an I/O bus 608. The I/O bus 608 is connected to the host bus 602 through an I/O bridge 618. The keyboard 610 and the mouse 612 are used by an operator to perform operations such as entering a command, or clicking on a menu. The display 614 is used for displaying a screen image for operating with a graphical user interface, GUI, according to the embodiment of the present invention to be described later.

Examples of computer system hardware suitably used for the above purpose include IBM® System X. In this case, CPU0 604a, CPU1 604b, CPU2 604c and CPU3 604d are, for example, Intel® Core 2 DUO and an operating system is Windows™ Server 2003. The operating system is stored in the hard disk drive 616 and loaded into the main memory 606 from the hard disk drive 616 when the computer system is started.

The computer system hardware that can be used for carrying out the present invention is not limited to IBM® System X but any computer system can be used as long as the computer system can run an ECU emulator program. The operating system is also not limited to Windows® but any operating system can be used, such as Linux® and Mac OS®. Furthermore, for high-speed running of the ECU emulator program, a computer system such as IBM® System P with AIX™ as the operating system based on POWER™ 6 can be used.

In the hard disk drive 616, multiple ECU emulator programs for testing and the program according to the embodiment of the present invention for testing by coordinating the plurality of ECU emulator programs are stored. Those programs can be run by use of the keyboard 610 and the mouse 612.

In order to realize full-vehicle SILS, all ECU emulator programs used in one automobile are preferably stored in the hard disk drive 616. If the ECU emulator program cannot retrieve an internal state variable as it is, the state variable is previously set to be retrievable by providing the wrapper code described above.

In the hard disk drive 616, also stored are: a scheduler to for the ECU emulator program be described later; a plant simulator program for an engine, a transmission, a steering wheel, wipers and the like; and a scenario generator program storing various test scenarios such as an uphill, an expressway and a winding road.

Note the use of the terms "emulator" and "simulator" here. An ECU code originally written by assuming that the code is operated by another processor is set to be operated by using CPU0 to CPU3 and the like as targets. This processing is called emulation and a program for performing the emulation is called an emulator. Meanwhile, a system for virtually calculating an operation of a physical system such as the engine is called a simulator.

Figure 7:
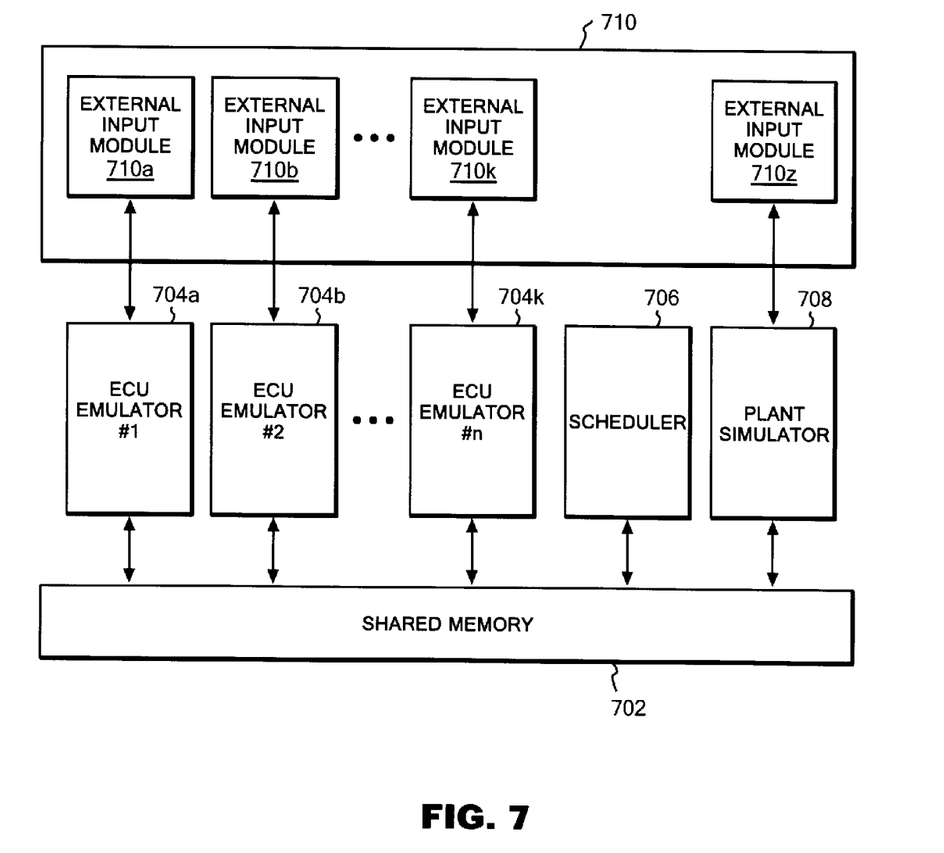
FIG. 7 shows a functional logic block diagram of a test system according to an embodiment of the present invention.

Next, with reference to FIG. 7, a functional logic block diagram of a test system according to the embodiment of the present invention will be described. In FIG. 7, a shared memory 702 can be a part of the main memory 606 shown in FIG. 6. ECU emulator programs 704a, 704b, . . . , 704k, a scheduler 706, and a plant simulator program 708 are logically connected to the shared memory 702.

As a functional logic block, there is also a scenario generator 710. The scenario generator 710 has external input modules 710a, 710b, . . . , 710k for inputting data to the ECU emulator programs 704a, 704b, . . . 704k, respectively, and an external input module 710z for inputting data to the plant simulator program 708.

The ECU emulator programs 704a, 704b, . . . , 704k correspond to controls of different parts of a vehicle, such as the engine, the brake, the transmission and the steering wheel, and are operated at different clock speeds respectively. Thus, the corresponding ECU emulator programs are also operated at corresponding proportional clock rates.

As an example, code for assigning the ECU emulator programs to multiple CPUs by creating threads will be described by taking C language as an example. void* ecu_wrapper (void* parm)

```
{
...
/* define state_repository */
...
LOOP_BEGIN:
...
/* perform unit processing of ECU */
LOOP_END:
...
}
```

When the following is set after preparation of the above code,
  pthread_t thread_id;
  pthread_attr_t thread_attr;
  pthread_attr_init(&thread_attr);
  pthread_create(&thread_id, thread_attr, ecu_wrapper, NULL);
  pthread_attr_destroy(&thread_attr);
the operating system generates a thread and assigns the thread to the ECU emulator program. Although the thread is physically assigned to either the CPU0 or the CPU 1, the assignment is left to the operating system and is transparent to the emulator program.

Such assignment processing is individually performed for each of the ECU emulator programs 704a, 704b, . . . , 704k.

Note that, in the logic configuration shown in FIG. 7, the ECU emulator programs 704a, 704b, . . . , 704k, the scheduler 706 and the plant simulator 708 exchange data by use of the shared memory 702. However, instead of the shared memory 702, a CAN (Controller Area Network) emulator can be used.

Figure 8:
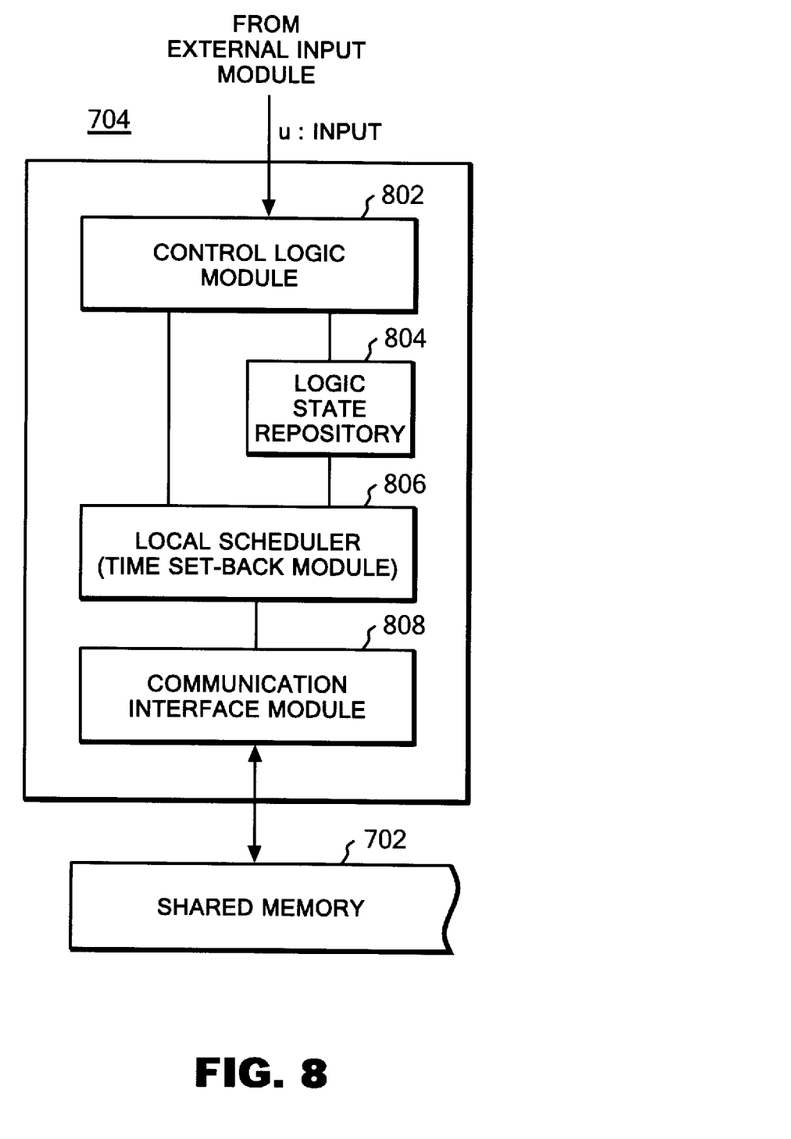
FIG. 8 shows a more detailed logic block diagram of an inside of an ECU emulator program.

FIG. 8 shows a more detailed logic block diagram of the internal configuration of the ECU emulator program 704. Here, the ECU emulator programs 704a, 704b, . . . , 704k will be collectively referred to as the ECU emulator program 704.

A control logic module 802 is the main body including the original logic of the ECU emulator.

A logic state repository 804 has the function of sequentially storing internal state variables retrieved from the control logic module 802 by use of the method for adding the wrapper code described above.

A local scheduler (time set-back module) 806 has a function of setting the ECU emulator program 704 back to a desired state by writing the internal state variables stored in the logic state repository 804 back into the control logic module 802. The logic state repository 804 and the local scheduler 806 can be included in the wrapper code, described above, which is added to the ECU emulator.

Note that, for convenience, FIG. 8 shows that inputs are given directly to the control logic module 802 from the external input module. However, those inputs are actually provided from the shared memory 702 through a communication interface module 808. Moreover, not shown is a flow of data to the input to the ECU emulator 704 from the scheduler 706. For example, an output from an air conditioner ECU is inputted to an engine ECU. This is because a change in engine speed is required according to the drive state of the air conditioner to regulate the amount of power to be generated.

The communication interface module 808 transmits the output from the control logic module 802 to the shared memory 702 or the CAN (Controller Area Network) emulator which is not shown.

Next, with reference to FIGS. 9 and 10, description will be given of processing of updating and using the state repository by the ECU emulator. This processing is typically performed for each predetermined clock by a program for controlling the entire emulation system shown in FIG. 7. In Step 902 of FIG. 9, it is determined whether or not the control logic module 802 in the ECU emulator has received an input u from the external input module in the scenario generator 710.

If the control logic module 802 has not received the input u, the last data which has already been received is set in Step 904. In Step 906, a subroutine called step execution, shown in FIG. 10, is executed.

Figure 10:
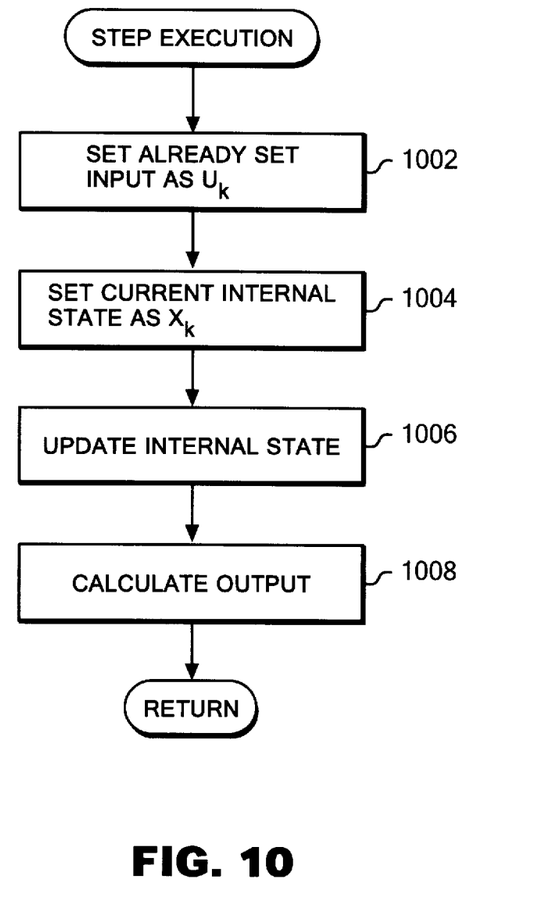
FIG. 10 shows a flowchart of processing of updating and using the state repository by the ECU emulator.

In the subroutine shown in FIG. 10, in Step 1002, the set input is set as $u_k$. After that, in Step 1004, the current internal state is set as $x_k$. Subsequently, in Step 1006, assuming that a function for calculating the internal state of the ECU emulator is g, a next internal state $x_{k+1}$ is calculated by $x_{k+1}=g(u_k, x_k)$. In Step 1008, an output $y_{k+1}$ is calculated by $y_{k+1}=f(x_{k+1})$.

Figure 9:
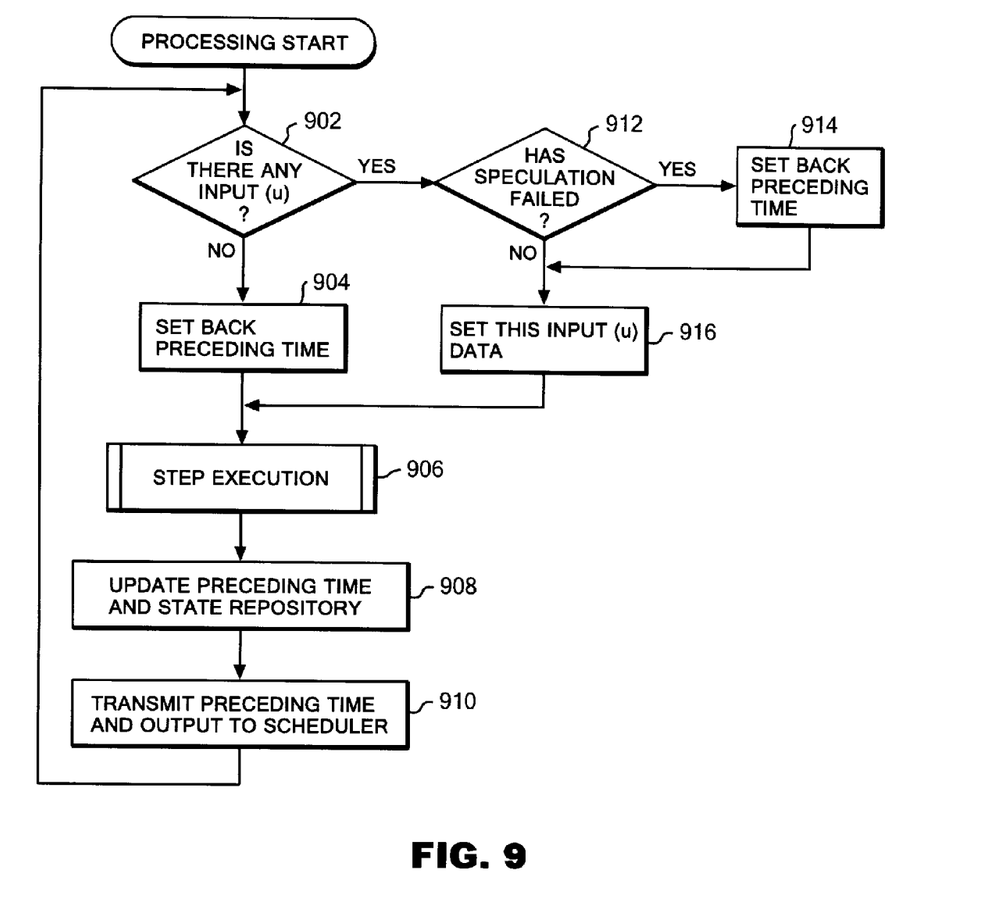
FIG. 9 shows a flowchart of processing of updating and using a state repository by an ECU emulator.

Here, the subroutine shown in FIG. 10 returns to Step 906 of FIG. 9. In the next Step 908, the current preceding time $c_k$, the internal state $x_k$ as a result of the calculation in Step 906 (in connection with FIG. 10, the next internal state $x_{k+1}$ calculated is read as $x_k$), the input $u_k$ and the actual arrival time $C(u_k)$ of the input $u_k$ are updated in the state repository.

The following Table 1 is an example of contents of the state repository.

TABLE 1

| Clock | State | Input | Arrival Time |
|---|---|---|---|
| $c_0$ | $x_0$ | $u_0$ | $C(u_0)$ |
| $c_1$ | $x_1$ | $u_1$ | $C(u_1)$ |
| $c_2$ | $x_2$ | $u_2$ | $C(u_2)$ |
| ... | ... | ... | ... |
| $c_k$ | $x_k$ | $u_k$ | $C(u_k)$ |

In Step 910, the preceding time $c_k$ and the output $y_k$ calculated in the subroutine shown in FIG. 10 (in connection with FIG. 10, the output $x_{k+1}$ calculated is read as $x_k$) are transmitted to the scheduler 706. There are the following two methods for this transmission. Specifically, in the case of a method using the shared memory, the time and output are written in an address of a specific memory and then signaled. In the case of a method using the CAN emulator, a header including a predetermined address is attached to a message to be sent. Such processing is performed by the communication interface module 808 shown in FIG. 8.

Back in Step 902, when the ECU emulator receives the input u from the external input module, the determination in Step 902 is turned positive and then the processing moves to determination in Step 912. In Step 912, it is determined whether or not speculation has failed.

The speculation failure is determined as follows. Specifically, if the time $C(u)$ attached to the newly received input u is larger than the latest preceding time, the input time is newer than the preceding time. Thus, the execution of the speculation has not been completed. Therefore, it is determined that the speculation has not failed. If there is a j-th entry that satisfies $c_j<=C(u)<c_{j+1}$ among entries in the state repository, an input $u_k$ recorded on the entry and the new input u are compared to each other. If the both entries are not identical, the speculation is determined to have failed.

If it is determined that the speculation has failed, the time is set back to $C(u)$ in Step 914. Thereafter, the internal state is set to a j-th state- $x_j$ that satisfies $c_j<=C(u)<c_{j+1}$ and the input u is set in Step 916.

If it is determined that the speculation has not failed, the processing immediately advances to Step 916 where the input u is set. Then the processing advances to the step execution routine in Step 906.

Figure 11:
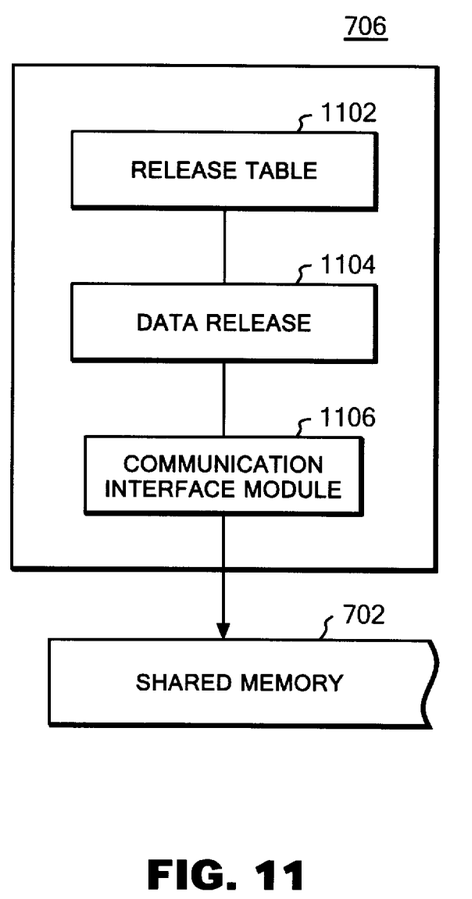
FIG. 11 shows a block diagram of a more detailed configuration of a scheduler.

FIG. 11 shows a logic block diagram of a more detailed internal configuration of the scheduler 706. Even if the scheduler 706 receives the output from the ECU emulator, the scheduler 706 does not immediately transmit data to the plant simulator 708. In order to flexibly synchronize with the ECU emulator having the lowest processing rate, in other words, the largest workload or a large original clock speed, processing for recording the preceding time of each of the ECU emulators in a release table 1102 is first performed.

Figure 12:
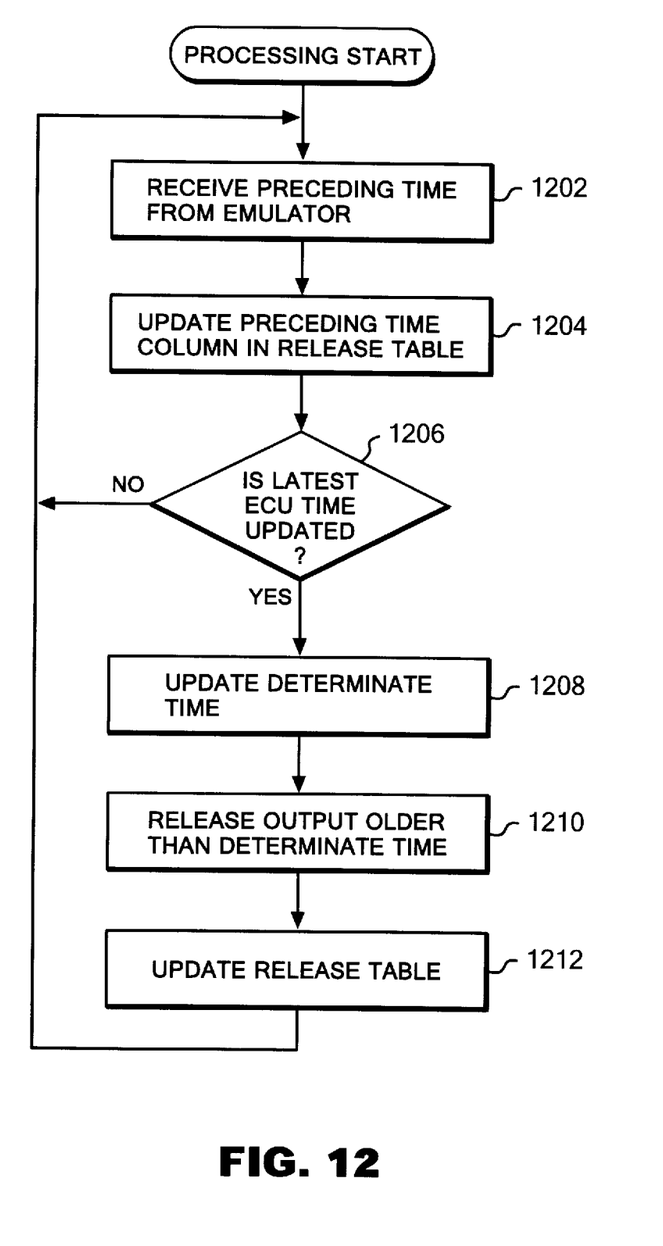
FIG. 12 shows a flowchart of processing executed by the scheduler.

Processing to be executed by the scheduler 706 will be described according to a flowchart shown in FIG. 12 while referring to the logic block diagram of FIG. 11. In FIG. 12, the scheduler 706 receives the preceding time of each ECU emulator in Step 1202. Moreover, the scheduler 706 also receives the output from each ECU emulator.

The following Table 2 is an example of contents of the release table 1102. As can be seen from the table, an output list and the corresponding preceding time are stored for each of the ECUs in the release table 1102.

TABLE 2

| ECU | Output List | Preceding Time |
|---|---|---|
| #1 | o1_0024, o1_0025, ... | 000347 |
| #2 | N/A | 000129 |
| ... | ... | ... |
| #n | on_0036, on_0037, ... | 000321 |

In Step 1204, the preceding time column in the release table 1102 is updated according to the preceding time received from the ECU emulator. In this updating of the preceding time, when a time older than the previously recorded preceding time is indicated as being the preceding time, the process of discarding temporary outputs after the time is performed. Thus, when each ECU receives an old time input while going further ahead, the ECU redoes the processing from there. Thus, it is required that outputs be cancelled that have been sent indicating that the time is after the previously recorded preceding time. Accordingly, processing is performed in Step 1204.

In Step 1206, it is determined whether or not the latest ECU time is updated. If so, the latest preceding time is updated as a determinate time in Step 1208. Thereafter, in Step 1210, an output older than the determinate time is released by a data release module 1104. The released output is sent to the shared memory 702 through a communication interface module 1106 and then transmitted to the plant simulator 708. The released output is also provided as an input to the ECU emulator through the shared memory 702. For example, the output from an air conditioner ECU emulator is supplied as an input to an engine ECU emulator. Thus, it is assured that all the ECU outputs to be transmitted have been successful in speculation.

The data release module 1104 updates the release table 1102 in Step 1212. This updating means discarding the entries older than the determinate time in the release table 1102. Thereafter, the processing returns to Step 1202.

If it is determined in Step 1206 that the latest ECU time is not updated, the processing immediately returns to Step 1202.

Meanwhile, in the processing shown in FIG. 9 by the ECU emulator 704 or the processing shown in FIG. 12 by the scheduler 706, updating may be delayed. Thus, the following processing is performed.

Figure 13:
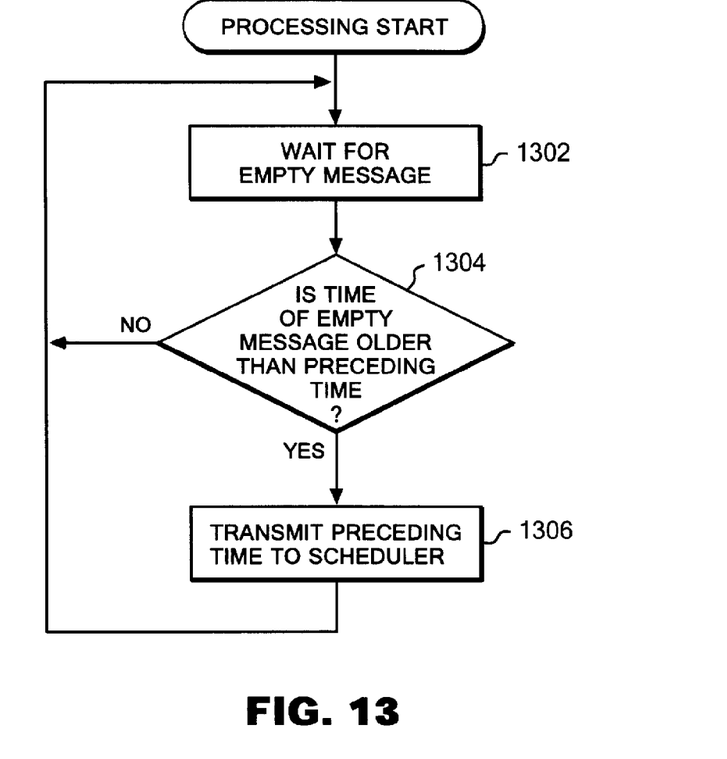
FIG. 13 shows a flowchart of processing an empty message by the ECU emulator.

First, the ECU emulator 704 waits for an empty message in Step 1302. This empty message, which will be described later, is regularly sent or broadcast from the scheduler 706.

In Step 1304, the ECU emulator 704 checks a time of the empty message transmitted from the scheduler 706 and determines whether the time is older than a preceding time of the ECU emulator 704. If the time is older than the preceding time, a message including the preceding time is transmitted to the scheduler 706, and if not, the processing immediately returns to Step 1302.

Figure 14:
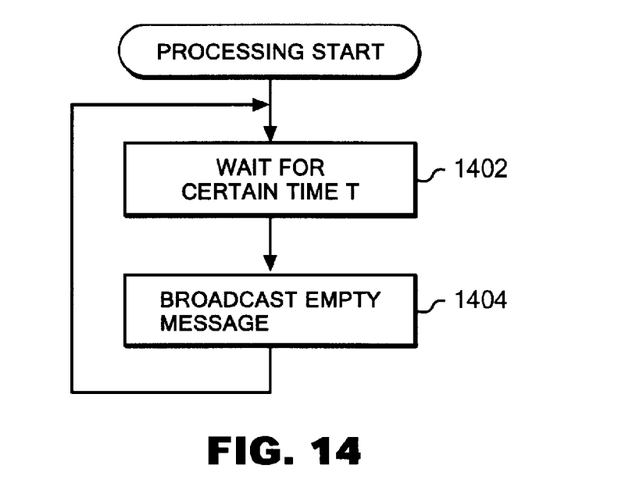
FIG. 14 shows a flowchart of processing of transmitting an empty message by the scheduler.

The scheduler 706 waits for a certain period of time T in Step 1402 and broadcasts an empty message with a time toward all the ECU emulators in Step 1404. By such a mechanism, the empty message is regularly and forcibly transmitted to the ECU emulator 704. Thus, stagnation of update time is eliminated.

Note that the examples of processing shown in flowcharts of FIGS. 13 and 14 are preferably started as separate threads on the ECU emulator 704 and the scheduler 706. Moreover, those examples of processing are executed independently of the examples of processing shown in FIGS. 9 and 12.

Referring back to FIG. 7, the scenario generator 710 provides time periods for an input expressing the intention of an operator and an input to be a load on the plants such as the engine, the brake, or the air conditioner. For example, the speed is gradually increased from a stop state and acceleration is set to 0 when the speed reaches 40 Km/hour. After running at a constant speed for a period of time, the speed is further increased. Alternatively, the scenario generator 710 provides time periods for changes in the load weight and the road gradient. In either case, the time is used as an input and corresponding parameter values are given to the ECU emulator or the plants.

Next, debug of the system shown in FIG. 7 will be described. For example, the debug is intended to conduct a test by returning to a point when an abnormality is detected if any abnormality is detected somewhere in the simulation system. The debug is started by the scheduler 706. Specifically, the scheduler 706 first resets the release table and then transmits a logical time reset signal and other initial inputs to each ECU emulator 704. In response to the logical time reset signal, the ECU emulator 704 sets back the logical time and resumes the steps of processing by referring to an entry corresponding to the logical time in the state repository held by the ECU emulator 704.

In connection with a test system including multiple ECU emulators for automobile, the specific embodiment of the present invention has been described above. However, those skilled in the art will understand that the present invention is not limited to such a specific embodiment but can be applied to a test system for a general electronic machine control system, such as a test system including ECU emulators for aircraft.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A simulation system for simulating a mechanism system controlled by a plurality of electronic control units operating at processing rates, the simulation system comprising:
    a memory and a processor communicatively coupled to the memory executing computer instructions provide
    a mechanism system simulator module;
    a plurality of electronic control unit emulator modules operating at a variety of processing rates electronically emulating the respective plurality of electronic control units, each thereby receiving an input signal with an input time and giving an output signal with an output time;
    a scheduler module receiving and storing the output signals with the times output time from each of the plurality of electronic control unit emulators, the schedule module configured to perform
        determining whether the output time received from a given electronic control unit emulator from the plurality of electronic control unit emulator modules is older than a previously recorded preceding time for the given electronic control unit emulator,
        in response to the output time received being older, sending to the given electronic control unit emulator a message with a broadcast time and repeating the determining step, and
        in response to time received not being older, updating a determinate time with a latest preceding time recorded and releasing output older than the determinate time in order to synchronize the release of the output from each of the electronic control unit emulators operating at a variety of processing rates to a system emulator.

2. The simulation system according to claim 1, wherein each electronic control unit emulator includes:
    means for calculating an output signal from an input signal received and for calculating an output signal by use of a previously received input signal if there is no input signal received in a certain period of time;
    means for recording the input signal used for the calculation with the input time; and
    means for comparing an input signal recorded in association with the input time of the input signal with the previously received input signal and for setting an internal state variable back to the input time of the previously received input signal in response to an inconsistency between the recorded input signal and the received input signal.

3. The simulation system according to claim 2, wherein each electronic control unit emulator further includes:
   means for recording the internal state variable for each input time; and
   means for setting an internal state variable in association with an input time to which the state is set back in response to setting back the state.

4. The simulation system according to claim 1, wherein each electronic control unit emulator and the scheduler are connected through a shared memory.

5. The simulation system according to claim 1, wherein each electronic control unit emulator and the scheduler are connected through a Controller Area Network (CAN) emulator.

6. A method implemented by a computer device for simulating a mechanism system controlled by a plurality of electronic control units operating at different processing rates, the method comprises the steps of:
   loading into a memory of the computer device a plurality of electronic control unit emulators operating at a variety of processing rates and a mechanism system simulator controlled by the computer device;
   receiving an input signal with an input time and giving an output signal with an output time by each electronic control unit emulator;
   receiving and storing each output signal with the output time from the plurality of electronic control unit emulators by a scheduler;
   determining by the scheduler whether the time received from a given electronic control unit emulator from the plurality of electronic control unit emulator modules is older than a previously recorded preceding time for the given electronic control unit emulator
      in response to time received being older, sending to the given electronic control unit emulator a message with a broadcast time and repeating the determining step, and
      in response to time received not being older, updating a determinate time with a latest preceding time received and releasing output older than the determinate time in order to synchronize the release of the output from each of the electronic control unit emulators operating at a variety of processing rates to a system emulator.

7. The method according to claim 6, wherein each of the electronic control unit emulators has modules executing the steps of:
   calculating an output signal by use of the input signal;
   calculating an output signal by use of an a previously received input signal if there is no input signal in a certain period of time;
   recording the input signal used for the calculation and the input time associated with the input signal;
   comparing an input signal recorded in association with the input time of the input signal with the previously inputted received input signal; and
   setting an internal state variable back to the input time of the previously received input signal in response to an inconsistency between the recorded input signal and the previously inputted received input signal.

8. The method according to claim 7, wherein each electronic control unit emulator has modules executing the steps of:
   recording the internal state variable for each input time; and
   setting an internal state variable in association with an input time to which the state is set back in response to setting back the state.

9. The method according to claim 6, wherein each electronic control unit emulator and the scheduler are connected through a shared memory.

10. The method according to claim 6, wherein each electronic control unit emulator and the scheduler are connected through a Controller Area Network (CAN) emulator.

11. A non-transitory computer readable storage medium tangibly embodying a computer readable program code having computer readable instructions which, when implemented, cause a computer to carry out the steps of a method for simulating a mechanism system controlled by a plurality of electronic control units operating at different processing rates, the method comprising steps of:
   loading into a memory of the computer, a plurality of electronic control unit emulators operating at different processing rates and a mechanism system simulator controlled by the computer;
   receiving an input signal with an input time and giving an output signal with an output time by each electronic control unit emulator;
   receiving and storing each output signal with the output time from the plurality of electronic control unit emulators by a scheduler;
   determining by the scheduler whether the time received from a given electronic control unit emulator from the plurality of electronic control unit emulator modules is older than a previously recorded preceding time for the given electronic control unit emulator
      in response to time received being older, sending to the given electronic control unit emulator a message with a broadcast time and repeating the determining step, and
      in response to time received not being older, updating a determinate time with a latest preceding time received and releasing output older than the determinate time in order to synchronize the release of the output from each of the electronic control unit emulators operating at a variety of processing rates to a system emulator.

12. The computer readable storage medium according to claim 11, wherein each electronic control unit emulator has modules executing the steps of:
   calculating an output signal by use of the input signal;
   calculating an output signal by use of a previously received input signal if there is no input signal in a certain period of time;
   recording the input signal used for the calculation and the input time associated with the received signal; and
   comparing an input signal recorded in association with the input time of the received input signal with the previously received input signal; and
   setting an internal state variable back to the input time of the previously received input signal in response to an inconsistency between the recorded input signal and the previously inputted received input signal.

13. The computer readable storage medium according to claim 12, wherein each electronic control unit emulator has modules executing the steps of:
   recording the internal state variable for each input time; and
   setting an internal state variable in association with an input time to which the state is set back in response to setting back the state.

14. The computer readable storage medium according to claim 11, wherein each electronic control unit emulator and the scheduler are connected through a shared memory.

15. The computer readable storage medium according to claim 11, wherein each electronic control unit emulator and the scheduler are connected through a Controller Area Network (CAN) emulator.

* * * * *